(12) United States Patent  (10) Patent No.: US 8,648,030 B2
Groshek et al.  (45) Date of Patent: Feb. 11, 2014

(54) SELF-CLEANING OVEN DEODORANTS AND METHODS FOR CLEANING OVENS

(76) Inventors: Rebecca J. Groshek, Plainfield, IL (US); Stephan Groshek, Plainfield, IL (US)

(*) Notice: Subject to any disclaimer, the term of this patent is extended or adjusted under 35 U.S.C. 154(b) by 0 days.

(21) Appl. No.: 13/449,669

(22) Filed: Apr. 18, 2012

(65) Prior Publication Data

US 2013/0281354 A1  Oct. 24, 2013

(51) Int. Cl.
*A61L 9/01* (2006.01)

(52) U.S. Cl.
USPC .................................................. 512/4

(58) Field of Classification Search
USPC ..................................................... 512/4
See application file for complete search history.

(56) References Cited

U.S. PATENT DOCUMENTS

| 2,988,284 | A |   | 6/1961  | Smith |             |
|-----------|---|---|---------|---------|-------------|
| 3,596,833 | A |   | 8/1971  | Gould |             |
| 4,375,213 | A | * | 3/1983  | Kemp et al. | 126/21 A |
| 4,544,592 | A |   | 10/1985 | Spector |           |
| 5,007,529 | A | * | 4/1991  | Spector | 206/0.5   |
| D458,992  | S |   | 6/2002  | Lincoln |           |
| 6,444,963 | B1 |  | 9/2002  | Donahue |           |
| 7,005,613 | B1 | * | 2/2006 | Spohn | 219/391     |
| 7,874,501 | B2 |  | 1/2011  | Griese et al. |     |
| 2007/0093404 | A1 | * | 4/2007 | Gross et al. | 510/407 |
| 2007/0105977 | A1 | * | 5/2007 | Gabriel et al. | 523/122 |
| 2010/0301128 | A1 | * | 12/2010 | Pisklak | 239/6 |
| 2011/0079658 | A1 |   | 4/2011 | Santini et al. |      |

FOREIGN PATENT DOCUMENTS

| CN | 2010022861 Y |   | 2/2008  |
|----|--------------|---|---------|
| JP | 3041960 A    |   | 2/1991  |
| JP | 03041960 A   | * | 2/1991  |
| KR | 2006055010 A |   | 5/2006  |
| KR | 2006110243 A |   | 10/2006 |

OTHER PUBLICATIONS

"Temperature Equivalent Chart for Orion Pyrometric Cones (C)—Cone Nos. 022-1" [No date provided].

* cited by examiner

*Primary Examiner* — Ling Choi
*Assistant Examiner* — Lanee Reuther
(74) *Attorney, Agent, or Firm* — Tech Valley Patent, LLC; John Pietrangelo

(57) ABSTRACT

Oven deodorants and methods of cleaning ovens using an oven deodorant, for example, for use in self-cleaning ovens, are provided. The oven deodorant is made of clay, for example, an unfired clay, and a fragrance. The fragrance volatilizes during heating in the oven and at least partially masks any undesirable odors generated in the oven, for example, the volatilized fragrance may mask odors generated during a high-temperature self-cleaning process. The clay may be any commercially available clay, for example, a pottery clay. The fragrance may be any conventional fragrance, for example, a fragrant oil, such as an herb-like fragrant oil.

15 Claims, 2 Drawing Sheets

SELF-CLEANING OVEN DEODORANTS AND METHODS FOR CLEANING OVENS

BACKGROUND OF THE INVENTION

1. Technical Field

The present invention generally relates to oven deodorants and the masking of malodorous gases that may be generated in an oven. More particularly, the present invention relates to oven deodorants for use during a self-cleaning process where the oven deodorant comprises clay and a fragrance that volatilizes when heated in an oven to at least partially mask malodorous gases generated in the oven during the self-cleaning process.

2. Description of Related Art

Undesirable odors may often be created when heating devices, such as, ovens, are in use. The increased temperatures generated in the heating device can often volatilize (or evaporate) substances that when airborne are offensive or noxious to human beings in the vicinity of the heating device. In the case of the common household stove or range, the "self-cleaning" process is well recognized by homeowners as a source of offensive odors.

Various approaches have been taken in the art to address this concern. For example, Korean patent publications KR2006055010A and KR2006110243A both recognize the need to remedy the generation of malodorous gases from ovens, and suggest mechanisms to address this concern.

The common microwave oven is also prone to generating undesirable odors. U.S. Pat. Nos. 5,007,529 and 6,444,963 and Japanese patent publication JP 3041960A propose methods and devices for addressing this problem for microwave ovens.

However, a need exists for providing methods and devices that minimize or prevent the emission of offensive odors from heating devices, in particular, from radiant-type heating devices, such as, electric or gas ovens. Moreover, there is a need in the art to minimize or prevent the emission of offensive odors generated during relatively higher temperature self-cleaning oven operations. Aspects of the present invention address these needs.

SUMMARY OF THE INVENTION

Aspects of the present invention address the needs not addressed by the prior art and provide devices and methods that effectively minimize or prevent the release of undesirable odors from heating devices, for example, from conventional gas and/or electric ovens. In particular, aspects of the present invention address the undesirable odors that characterize the operation of ovens during the self-cleaning process.

One embodiment of the invention is a self-cleaning oven deodorant comprising, including, or consisting of an unfired clay and a fragrance. For example, the unfired clay may be unfired pottery clay, unfired kaolin, unfired ball clay, unfired fire clay, unfired stoneware clay, unfired red clay, unfired shale clay, and unfired bentonite clay. In one aspect, the oven deodorant comprises a radiant-heating oven deodorant, for example, that is differentiated from a microwave oven deodorant. The fragrance may be a fragrant oil. In one aspect, the fragrance may be one or more of a fruit-like fragrance, a flower-like fragrance, an herb-like, food-like, or a spice-like fragrance. In one aspect, the oven deodorant may also include a fragrance-retaining body adapted to retain the fragrance, for example, at least one fibrous body, for instance, a fiberglass fibrous body. The unfired clay may be a pottery clay having a range of Orton cone.

Another embodiment of the invention is a method for cleaning an oven, the method comprising or including: positioning an oven deodorant comprising unfired clay and a fragrance in a heating cavity of the oven; raising a temperature of gas in the heating cavity and raising a temperature of the oven deodorant; allowing combustible compounds present in the heating cavity to oxidize due to the temperature in the heating cavity; and allowing the fragrance from the oven deodorant to volatilize into the heating cavity to at least partially mask any undesirable odors created. The oven deodorant may be any one of the oven deodorants described above. In one aspect, the method may further comprise, prior to raising the temperature of the gas in the heating cavity, at least partially isolating the heating cavity of the oven from a surrounding environment, for example, mechanically fastening the door of the oven shut. In one aspect, raising the temperature of the gas in the heating cavity may be practiced by raising the temperature of the gas in the heating cavity to at least 900 degrees F. In another aspect, the method may further comprise maintaining the temperature of the gas in the heating cavity at a predetermined temperature for a predetermined time. In another aspect of the invention, allowing the fragrance from the oven deodorant to volatilize is practiced during raising the temperature of the gas in the heating cavity or during maintaining the temperature of the gas in the heating cavity at the predetermined temperature, or during both steps.

A further embodiment of the invention is an oven deodorant comprising, including, or consisting of clay and a fragrance. The clay may be any one or more of the clays identified above, for example, an unfired pottery clay. Also, the fragrance in this embodiment may be any one or more of the fragrances identified above, for example, a fragrant oil. In one aspect, the oven deodorant may also include a fragrance-retaining body adapted to retain the fragrance, for example, a fiberglass cord or sheet.

A further embodiment of the invention is a self-cleaning, radiant oven deodorant comprising an unfired clay and a fragrance. For example, the self-cleaning, radiant oven deodorant is adapted for use in a radiant oven, for example, a non-microwave oven. Again, the unfired clay may comprise any one or more of the clays identified above, for example, unfired pottery clay having an Orton cone. Also, the fragrance in this embodiment may be any one or more of the fragrances identified above, for example, a fragrant oil. In one aspect, the self-cleaning, radiant oven deodorant may also include a fragrance-retaining body adapted to retain the fragrance, for example, a fiberglass cord or sheet.

A further embodiment of the invention is a method of using an oven comprising or including: positioning an oven deodorant comprising clay and a fragrance in a heating cavity of the oven; raising a temperature of gas in the heating cavity and raising a temperature of the oven deodorant; and allowing the fragrance from the oven deodorant to volatilize into the heating cavity of the oven. The oven deodorant may be any one or more of the oven deodorants described above. In one aspect, the method may further include at least partially masking any undesirable odors created in the oven cavity with the volatilized fragrance. In another aspect, the method may also include maintaining the temperature of the gas in the heating cavity at a predetermined temperature for a predetermined time. In addition, in one aspect, allowing the fragrance from the oven deodorant to volatilize is practiced during raising the temperature of the gas in the heating cavity or maintaining the temperature of the gas in the heating cavity at the predetermined temperature or during both processes.

A still further embodiment of the invention is a method for cleaning an oven comprising or including: positioning an oven deodorant comprising clay and a fragrance in a heating cavity of the oven; raising a temperature of gas in the heating cavity of the oven to a temperature sufficient to oxidize at least some of the material in the heating cavity and to raise a temperature of the oven deodorant; while raising the temperature of the gas in the heating cavity, volatilizing at least some of the material in the heating cavity to produce a volatilized gas have an undesirable odor and allowing the fragrance from the oven deodorant to volatilize into the heating cavity of the oven and at least partially mask the undesirable odor; and oxidizing the at least some of the undesirable material in the heating cavity. The oven deodorant may be any one or more of the oven deodorants described above. In one aspect, the method may further include, prior to raising the temperature of the gas in the heating cavity, at least partially isolating the heating cavity of the oven from a surrounding environment. In another aspect, the method may also include maintaining the temperature of the gas in the heating cavity at a predetermined temperature for a predetermined time. Also, allowing the fragrance from the oven deodorant to volatilize may be practiced during raising the temperature of the gas in the heating cavity or during maintaining the temperature of the gas in the heating cavity at the predetermined temperature or during both processes.

A still further aspect of the invention is a method of treating an article of food in an oven comprising or including: positioning the article of food in a heating cavity of the oven; positioning an oven deodorant comprising clay and a fragrance in the heating cavity of the oven; raising a temperature of gas in the heating cavity and raising a temperature of the oven deodorant; allowing the fragrance from the oven deodorant to volatilize into the heating cavity of the oven; and exposing the article of food to the volatilized fragrance to introduce at least some of the fragrance to the article of food. The oven deodorant may be any one or more of the oven deodorants described above. The article of food may be a baked good, meat, a vegetable, or a combination thereof. In one aspect, the method may further include maintaining the temperature of the gas in the heating cavity at a predetermined temperature for a predetermined time.

These and other aspects, features, and advantages of this invention will become apparent from the following detailed description of the various aspects of the invention taken in conjunction with the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention will be readily understood from the following detailed description of aspects of the invention taken in conjunction with the accompanying drawings, in which:

DETAILED DESCRIPTION OF THE INVENTION

Figure 1:
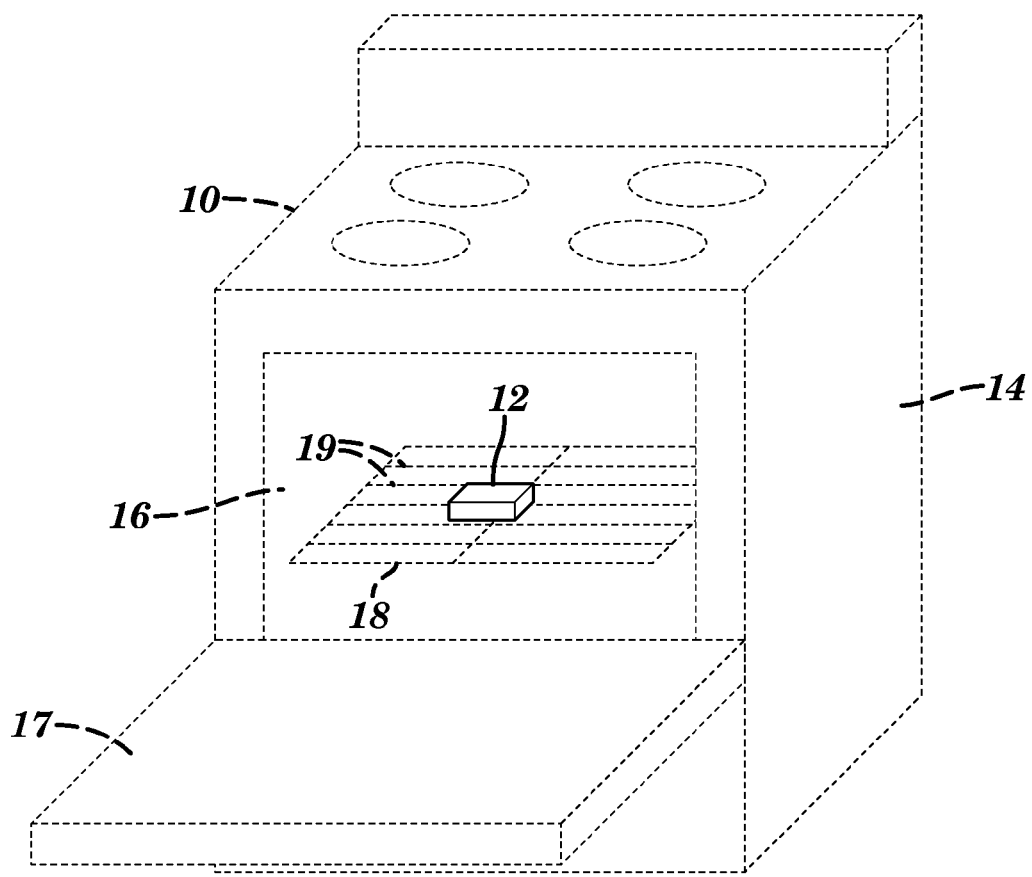
FIG. 1 is a perspective view of an oven containing an oven deodorant according to one aspect of the invention.

FIG. 1 is a perspective view of a heating device, specifically, an oven, 10 (shown in phantom) containing an oven deodorant 12 according to one aspect of the invention. Though according to aspects of the invention oven 10 may comprise any type of conventional heating device, for example, a heating device having an enclosure into which oven deodorant 12 is placed, such as, a residential oven, a commercial oven, an autoclave, a kiln, a furnace, or a forge, and the like, for the sake of illustration oven 10 is shown as a conventional residential oven, for example, as would be found in the conventional home or apartment. In another aspect of the invention, the heating device may not include an enclosure into which oven deodorant 12 is inserted. In one aspect, the heating device may have an external surface that may be heated by the heating device and upon which a deodorant 12 may be placed. For example, in one aspect, deodorant 12 may be placed upon or adjacent to an external surface of a stove, such as, a top or side of a wood stove or on top of a pellet-burning stove and the like, or adjacent a gas fireplace. In another aspect, deodorant 12 may be placed in or near a fireplace, for example, on a fireplace grate, on the wood burned in the fireplace, or on the hearth or mantle of a fireplace. It will be clear to those of skill in the art that aspects of the invention may be used for any heating device, for example, any heating device that may produce undesirable or noxious odors when operated. Some aspects of the invention are uniquely suited for use in ovens undergoing a "self-cleaning" process, as discussed below.

In one aspect of the invention, oven 10 may typically comprise a housing 14 and an internal cavity or heating cavity 16 that is typically heated, for example, by a radiant heating element, convection, or electromagnetic means, for example, a microwaves. Though in one aspect of the invention, oven deodorant 12 may be used in any type of oven or heating device, in another aspect, oven deodorant 12 may be used in a radiant-type heating device, for example, for a non-microwave oven, such as, a gas (propane, natural gas, and the like) oven or an electric oven. Oven 10 includes a door 17 (shown open and in phantom) and typically includes at least one surface or support 18, for example, a bottom surface of cavity 16, a tray, a shelf, or a rack 18 upon which to position oven deodorant 12. For example, for the aspect of the invention shown in FIG. 1, oven deodorant 12 is positioned on a conventional oven rack 18 (shown in phantom) having a plurality of bars or rods 19 positioned to support an object being heated or cooked (not shown), and, in this case, to support oven deodorant 12. Though no shown in FIG. 1, in one aspect, oven 10 is adapted to perform a "self-cleaning" process.

Figure 2:
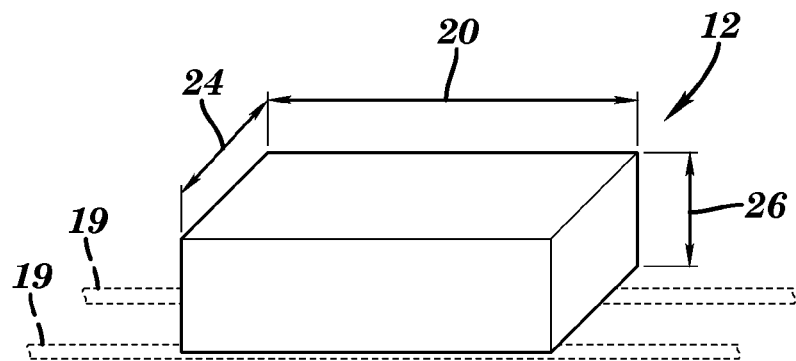
FIG. 2 is a perspective view of the oven deodorant shown in FIG. 1.

FIG. 2 is a perspective view of the oven deodorant 12 shown in FIG. 1. As shown in FIG. 2, oven deodorant 12 may comprise a parallelepiped shape, for example, a rectangular parallelepiped, such as, a bar, a brick, a cube, or a block; however, according to aspects of the invention, the form of oven deodorant 12 may take a broad range of geometric shapes, for example, those shapes shown in FIGS. 2 through 4, among others. However, in no way should the reader limit the shape of oven deodorant 12 to those shapes shown. Oven deodorant 12 may be provided in any conceivable three-dimension shape.

According to aspects of the present invention, oven deodorant 12 is made from clay and a fragrance, for example, a fragrance that may volatilize when deodorant 12 is heated, for example, by the heating means of oven 10. The clay may comprise any conventional clay, for example, kaolin, ball clay, fire clay, stoneware clay, red clay, shale clay, and bentonite clay, among others. According to aspects of the invention, the clay of oven deodorant 12 may typically be "unfired," that is, not thermally treated to harden the clay into, for example, a ceramic. In one aspect, oven deodorant 12 may comprise "greenware" as known in the pottery art. However, in one aspect of the invention, the clay of deodorant 12 may be at least partially "fired" where at least a portion of deodorant 12 is hardened due to heat.

In one aspect of the invention, the clay content of oven deodorant 12 may comprise pottery clay, for example, conventional clay used to mold or throw clay pots or bowls, among other items, which may typically be subsequently fired to form ceramic articles. As known in the art, pottery clay may be classified by "cone" or "pyrometric cone." A "cone" designation corresponds to the approximate time and temperature at which the clay is fired to produce the desired ceramic. Specially, pyrometric cones are standardized conical ceramic pieces that are placed with the unfired clay piece in a kiln and typically deflect or bend under time and temperature and provide a visual indication of the time and temperature to which the fired pottery is exposed. As known in the art, pottery clays are typically characterized by "cone" or range of cone that can be used when firing the clay. For example, pottery clay may be characterized as a "cone 2-7 pottery clay," or "cone 4-7 pottery clay", or "cone 5-10 pottery clay," where the cone values refer to the Orton ceramic cones, established by the The Edward Orton Jr. Ceramic Foundation of Westerville, Ohio, though other cone designations may apply to aspects of the invention. The clay used in aspects of the invention may correspond to any cone or range of cone. For example, the clay use may correspond to a clay having a Orton cone ranging from 022 to 14, for instance, as these cone values appear in the table entitled "Temperature Equivalent Chart for Orton Pyrometric Cones (° C.)—Cone Numbers 022-1" provided by The Edward Orton Jr. Ceramic Foundation is incorporated by reference herein.

In one aspect of the invention, the clay content of oven deodorant 12 may be provided by any pottery clay, for example, any pottery clay characterized by having an Orton cone value, or a range of Orton cone values as described above. For instance, in one aspect, the clay content of oven deodorant 12 may be provided by a cone 06-7 pottery clay, for example, a "#7 White Buff Clay Cone 06-7—Dry" pottery clay provided by Minnesota Clay Company of Plymouth, Minn., or its equivalent.

The fragrance used for aspects of the invention may be any available fragrance, aroma compound, odorant, aroma, fragrance, essence, or flavor, or a combination thereof. According to aspects of the invention, when the term "fragrance" is used herein, and in the attached claims, the term is meant to apply to any substance that emits a desirable odor or aroma, for example, emits a desirable odor or aroma when heated, for instance, in oven 10. However, in one aspect, the desirable odor or aroma may be emitted without the presence of heat or elevated temperature, for example, the fragrance may emit a desirable odor or aroma when unheated or at room temperature (that is, at or about 68 degrees F.), while, for instance, also emitting fragrance when heated. In one aspect, the fragrance may be in the form of a solid, a liquid, or a gas. When the fragrance comprise a fluid, for example, a liquid and/or gas, the liquid and/or gaseous fragrance may be emitted from oven deodorant 12 when oven deodorant 12 is exposed to temperature, for example, by means of the heat-rupturable enclosure or capsule into which the liquid or gaseous deodorant is provided in or on the clay matrix.

According to another aspect of the invention, the fragrance may be held or retained by a fragrance-retaining body or a fragrance reservoir, for example, a container, an enclosure, or a fragrance absorbent material. Preferably, in one aspect, the fragrance-retaining body is heat resistant at the temperature to which aspects of the invention are intended to be exposed, for example, in one aspect, the fragrance retaining body may be non-combustible. One fragrance retaining body may comprise temperature resistant fibers or a temperature resistant weave of fibers, for example, one or more sheets of fiber or one or more lengths of fibers twisted or braided together. In one aspect, the fibrous body may be adapted to absorb and/or retain at least some of the fragrance, for example, by "wicking" or capillary action. According to one aspect, a fragrance may be captured and retained by a fibrous body and the fibrous body attached to or embedded into the clay. For example the fibrous body may be one or more sheets of fibrous material, such as, cotton fibers, fiberglass fibers, or plastic fibers, such as, polyacrylate, nylon, polytetrafluoroethylene (PTFL) fibers (for example, DuPont's Teflon® PTFL), or polyethylene fibers. Prior to introducing the fibrous bodies or fibers to the clay, the fibrous bodies or fibers may be exposed to the fragrance where at least some of the fragrance is absorbed and/or retained by the fibrous body or fibers before the fibrous body or fibers is embedded into the clay. According to aspects of the invention, fragrance-retaining body or fragrance reservoir functions to retain the fragrance whereby the amount of fragrance may be varied or the release of the fragrance may be varied.

According to aspects of the invention, the fragrance may be a fruit-like fragrance, for example, emitting an aroma like lemon, orange, apple, pear, or the like; the fragrance may be a floral or flower-like fragrance, for example, emitting an aroma like rose, lilac, violet, or the like; the fragrance may be an herb-like or a spice-like, for example, emitting an aroma like thyme, basil, coriander, lavender, jasmine, almond, clove, vanilla, anise, cinnamon, mint, or the like; the fragrance may resemble a food, for example, emitting an aroma of pumpkin pie, coffee, brownies, chocolate chip cookies, sugar cookies, vanilla bean, lemon curd, scones, or the like. Other fragrances may include "fresh," woody, ocean, "clean," or nutty, among others. In one aspect, the fragrance may be of perfume or perfume-like or cologne or cologne-like The fragrance may be provided in the raw form of the fragrance, for example, cinnamon or thyme, or the fragrance may be provided in the form of an oil, such as, a fragrance oil, an aroma oil, an aromatic oil, or a flavor oil, and the like. The fragrance may be synthetic or naturally occurring, or a combination thereof.

According to aspect of the invention, the oven deodorant 12 may comprise predominantly clay, for example, over 90% by weight of the oven deodorant 12 may typically compose clay, but typically, over 95% by weight, and even over 99% by weight of the oven deodorant may comprise clay. For example, and this example is meant to be illustrative only and in no way limits the scope of the content of aspects of the present invention, the oven deodorant 12 may comprise 1 pound (lb., or 16 ounces (oz.)) of clay, for example, cone 5-10 pottery clay, and about 1/16 oz. to about 4 oz. of fragrance, for example, between about 1/8 oz. and about 1 oz. of fragrance. However, it will be understood by those of skill in the art that the amount of fragrance used per pound of clay may vary broadly based upon the fragrance used, the temperature the oven deodorant 12 is expected to experience, and the sensitivity of those likely to encounter the emitted fragrance, among other things.

The clay and fragrance may be combined or mixed by conventional means. For example, kneading, for instance, manual or automated kneading, may combine the clay and fragrance. In one aspect, a predetermined weight portion of clay may be provided and the fragrance sprinkled over the clay before kneading. In addition, water may be added or removed (for example, by drying or heating) to provide a desired consistency. In one aspect, the consistency of the oven deodorant 12 may vary from about 70% solids by weight to about 95% solids by weight, for instance, from about 75% solids by weight to about 85% solids by weight. Combining or mixing of the clay and fragrance may also be practiced using an automated mixer or kneader.

Figure 3:
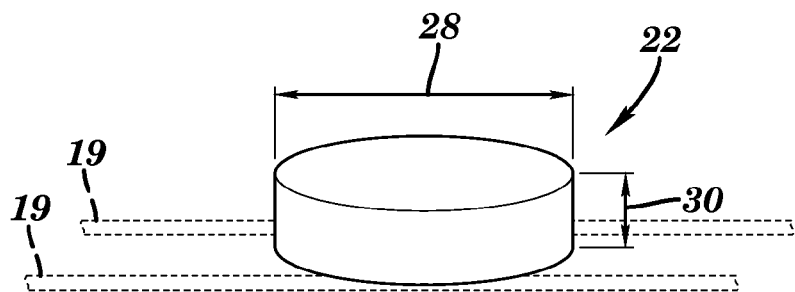
FIGS. 3 and 4 are perspective views similar to FIG. 2 of oven deodorants according to further aspects of the invention.
Figure 4:
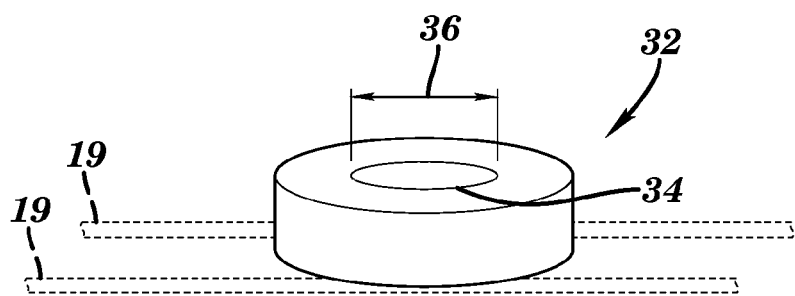

FIGS. 3 and 4 are perspective views similar to FIG. 2 of oven deodorants 22 and 32 according to further aspects of the invention, for example, as positioned on bars 19 (shown in phantom) of rack 18 of oven 10 shown in FIG. 1. As shown in FIG. 3, in one aspect, oven deodorant 22 may be provided in the shape of a circular cylinder, for instance, a right circular cylinder, or disk. As shown in FIG. 4, in one aspect, oven deodorant 32 may be provided in the shape of a circular cylinder, for instance, a right circular cylinder, or disk having a cavity or through-hole 34, for example, a concentric cavity or through-hole. Oven deodorants 12, 22, and/or 32 may be provided in any conceivable three-dimension shape, including, but not limited to, a cone, a pyramid, or a "bundt-like" shape, that is, a toroidal shape having scalloped or fluted sides. In one aspect, oven deodorants 12, 22, and/or 32 may assume the shape of a food item, for instance, a fruit, a vegetable, a food item, a baked item, or a cooked item. In one aspect, oven deodorants 12, 22, and/or 32 may take the form of fruit, for example, an apple, a banana or an orange, and the like; may take the form of a vegetable, such as, a tomato, a pumpkin, a potato, or an onion, and the like; may take the form of a food item, such as, a bundt cake, a cup cake, or a pie, among others. Other shapes that oven deodorants 12, 22, and/or 32 may take will be apparent to homemakers, chefs, bakers, and others of skill in the art.

As shown in FIG. 2, when in the form of a parallelepiped, oven deodorant 12 may have a length 20 ranging from about 0.25 inches to about 12 inches, but typically has a length 20 between about 2 inches and about 6 inches; oven deodorant 12 may have a width 24 ranging from about 0.25 inches to about 12 inches, but typically has a width 24 between about 1 inch and about 4 inches; and oven deodorant 12 may have a thickness 26 ranging from about 0.25 inches to about 6 inches, but typically has a thickness 26 between about 1 inch and about 3 inches. As shown in FIG. 3, when in the form of a cylinder, oven deodorant 22 may have a diameter 28 ranging from about 0.25 inches to about 12 inches, but typically has a diameter 28 between about 2 inches and about 6 inches; and oven deodorant 22 may have a thickness 30 ranging from about 0.25 inches to about 6 inches, but typically has a thickness 30 between about 1 inch and about 3 inches. As shown in FIG. 4, when in the form of a hollow cylinder, oven deodorant 32 may have an inside diameter 36 ranging from about 0.125 inches to about 6 inches, but typically, has an inside diameter 36 between about 1 inch and about 3 inches. Oven deodorant 32 may also have an outsider diameter similar to diameter 28 and a thickness similar to thickness 30 shown in FIG. 3.

Since oven deodorants 12, 22, and 32 are predominantly made of clay, the density of 12, 22, and 32 may typically be comparable to that of clay, for example, about 2.0 to 2.5 grams per cubic centimeter [$g/cm^3$].

In one aspect of the invention, oven deodorants 12, 22, and 32 are uniquely adapted for use during an oven "self-cleaning" process, for example, where oven 10 shown in FIG. 1 includes a "self-cleaning" feature. As known in the art, and as used herein, an oven can be "self-cleaned" when the oven, or other heated device or enclosure, generates high temperatures, for example, above about 900 degrees F. (482 degrees C.) whereby any undesirable cooking residue, for example, cooking grease or baking residues, are oxidized (that is, burned) to form an ash. The self-cleaning oven is typically mechanically locked closed, during the self-cleaning process, which may last from 2 to 4 hours. As in known in the art, during the heating and oxidation of the undesirable cooking residues in the self-cleaning oven, undesirable or noxious odors can be generated which, if unchecked, can permeate the surrounding area, for example, a kitchen and adjacent dining areas.

According to one aspect of the invention, the use of an oven deodorant 12, 22, and/or 32 in an oven 10 during a self-cleaning process may minimize or eliminate the undesirable odors commonly experienced when an oven is self-cleaned. For example, in one aspect, prior to the initiation of the self-cleaning process, at least one (but two or more may be used) oven deodorants 12, 22, and/or 32 are positioned in the self-cleaning oven (for example, on rack 18 in oven 10 of FIG. 1), the oven heating cavity 16 is then isolated from the surrounding environment, for example, the door of the oven 10 is closed, and preferably mechanically prevented from being opened (for example, "locked"). With the one or more oven deodorants 12, 22, or 32 in place, the self-cleaning process is initiated whereby the temperature of the heating cavity 16 is raised, again, typically, above about 900 degrees F., and the cooking residues are oxidized to ash. However, according to aspects of the invention, should any undesirable odors be generated during the cleaning process, they can be masked by the fragrance emitted by oven deodorant 12, 22, and/or 32 which is volatilized or is increasingly volatilized as the temperature of the heating cavity 16 of oven 10 is increased.

In one aspect of the invention, the volatility or the amount of the fragrance in oven deodorants 12, 22, and 32 may be controlled or regulated whereby the fragrance is emitted at the most optimum time, for example, when malodorous gases are created in oven 10. According to aspects of the invention, the term "volatility" is used as is common in the art, that is, with respect to the fragrance; "volatility" refers to the tendency of the fragrance to vaporize (or, for solids, to sublimate). For example, in one aspect, when malodorous gases are generated during the heating of the heating cavity 16, the volatility and/or the amount of fragrance present in the oven deodorant 12, 22, and/of 32 is emitted during the heat up (that is, ramp up) to the target cleaning temperature, for example, about 950 degrees F.). In another aspect, when malodorous gases are generated at or during the maintenance of the target temperature (for example, about 950 degrees F.), the volatility and/or the amount of fragrance present in the oven deodorant 12, 22, and/of 32 is emitted before and/or during the maintenance of the target cleaning temperature. In one aspect, the volatility of the fragrance may be regulated or varied by varying the solvent into which the fragrance is dissolved or immersed. For example, in one aspect, the vitality of the fragrance may be varied by replacing a higher volatility solvent (that is, a solvent that vaporizes at a lower temperature), such, as an alcohol or water, with a higher volatility solvent (that is, a solvent that vaporizes at a higher temperature), such as, an oil, for instance, a vegetable oil or a mineral oil.

In one aspect of the invention, oven deodorants 12, 22, and/or 32 may be dyed or otherwise colored or decorated. For example, oven deodorants 12, 22, and/or 32 may be decorated with engravings or stampings, such as, engravings or stampings of a word, words, phrases, logos, pictures, for example, stampings of leaves or fruits and/or vegetables, such as pumpkins. In one aspect, the word or words may correspond to the fragrance comprising the oven deodorant, for example, an oven deodorant having a pumpkin pie fragrance may be stamped with one or more pumpkins. Other engravings or stampings of oven deodorants 12, 22, and/or 32 will be apparent to homemakers, chefs, bakers, and others of skill in the art.

It will be apparent from the above detailed descriptions of aspects of the invention that various oven deodorants and methods of deodorizing ovens, for example, during and/or after a self-cleaning process, are provided. Aspects of the invention overcome the disadvantages of prior art methods and devices by minimizing or eliminating the detection of malodorous gases and/or undesirable odors in and around ovens, or in and around any heating device that may generate malodorous gases and/or undesirable odors.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A self-cleaning oven deodorant positionable inside a self-cleaning oven, the oven deodorant comprising a three-dimensional shape comprising an unfired clay and a fragrance; wherein the oven deodorant comprises over 90% unfired clay by weight; and wherein the oven deodorant is capable of withstanding a temperature of a self-cleaning oven process.

2. The self-cleaning oven deodorant as recited in claim 1, wherein the unfired clay comprises at least one of unfired pottery clay, unfired kaolin, unfired ball clay, unfired fire clay, unfired stoneware clay, unfired red clay, unfired shale clay, and unfired bentonite clay.

3. The oven deodorant as recited in claim 1, wherein the self-cleaning oven deodorant comprises a self-cleaning, radiant oven deodorant.

4. The self-cleaning, radiant oven deodorant as recited in claim 3, wherein the radiant oven deodorant comprises a non-microwave oven deodorant.

5. The oven deodorant as recited in claim 1, wherein the fragrance comprises a fragrant oil.

6. The oven deodorant as recited in claim 1, wherein the fragrance comprises one or more of a fruit fragrance, a flower fragrance, an herb fragrance, a food fragrance, and a spice fragrance.

7. The oven deodorant as recited in claim 1, wherein the oven deodorant further comprises a fragrance-retaining body adapted to retain the fragrance.

8. The oven deodorant as recited in claim 7, wherein the fragrance-retaining body comprises at least one fibrous body.

9. The oven deodorant as recited in claim 8, wherein the at least one fibrous body comprises fiberglass.

10. The oven deodorant as recited in claim 1, wherein the unfired clay comprises a pottery clay having a range of Orton cone.

11. The oven deodorant as recited in claim 10, wherein the unfired clay comprises a pottery clay having a range of Orton cone from and including cone 022 to and including cone 14.

12. The oven deodorant as recited in claim 1, wherein the temperature of the self-cleaning oven process comprises at least 900 degrees F.

13. The oven deodorant as recited in claim 1, wherein the three-dimensional shape comprises at least one of a bar, a brick, a cube, a block, a circular cylinder, a right circular cylinder, a disk, a cone, a pyramid, a bundt shape, a fruit shape, a vegetable shape, a food item shape, a baked item shape, and a cooked item shape.

14. The oven deodorant as recited in claim 1, wherein positionable inside a self-cleaning oven comprises positionable on a surface inside the self-cleaning oven.

15. The oven deodorant as recited in claim 14, wherein the surface comprises one of a bottom surface of a self-cleaning oven cavity, a tray, a shelf, and a rack.

* * * * *